United States Patent
Straehle et al.

(10) Patent No.: US 11,738,463 B2
(45) Date of Patent: Aug. 29, 2023

(54) METHOD AND DEVICE FOR CONTROLLING A ROBOT

(71) Applicant: Robert Bosch GmbH, Stuttgart (DE)

(72) Inventors: Christoph-Nikolas Straehle, Weil der Stadt (DE); Seyed Jalal Etesami, Lausanne (CH)

(73) Assignee: ROBERT BOSCH GMBH, Stuttgart (DE)

( * ) Notice: Subject to any disclaimer, the term of this patent is extended or adjusted under 35 U.S.C. 154(b) by 195 days.

(21) Appl. No.: 17/156,156

(22) Filed: Jan. 22, 2021

(65) Prior Publication Data

US 2021/0252711 A1   Aug. 19, 2021

(30) Foreign Application Priority Data

Feb. 14, 2020   (EP) ..................... 20157410

(51) Int. Cl.
*B25J 9/16*   (2006.01)
(52) U.S. Cl.
CPC .......... *B25J 9/1694* (2013.01); *B25J 9/1664* (2013.01); *G05B 2219/50391* (2013.01)
(58) Field of Classification Search
CPC ...... B25J 9/1694; B25J 9/1664; B25J 9/1666; B25J 9/1676; B25J 5/007; B25J 9/162;
(Continued)

(56) References Cited

U.S. PATENT DOCUMENTS

| | | | | |
|---|---|---|---|---|
| 11,230,297 | B2* | 1/2022 | Zhu | B60W 40/04 |
| 2017/0210379 | A1* | 7/2017 | Obata | B60W 30/18163 |

(Continued)

FOREIGN PATENT DOCUMENTS

DE   102018210280 A1   1/2020

OTHER PUBLICATIONS

Casadiego and Pelechano: "From One to Many: Simulating Groups of Agents with Reinforcement Learning Controll ers", 2015 International Conference on Financial Cryptography and Data Security; [Lecture Notes in Computer Science], Springer Int'l Publ., Switzerland IVA 2015, LNAI 9238, pp. 119-123, XP047317440.

(Continued)

*Primary Examiner* — Abby Y Lin
*Assistant Examiner* — Esvinder Singh
(74) *Attorney, Agent, or Firm* — Norton Rose Fulbright US LLP; Gerard Messina

(57) ABSTRACT

A method for controlling a robot is described. The method includes acquiring sensor data representing an environment of the robot, identifying one or more objects in the environment of the robot from the sensor data, associating the robot and each of the one or more objects with a respective agent of a multiagent system, determining, for each agent of the multiagent system, a quality measure which includes a reward term for a movement action at a position and a coupling term which depends on the probabilities of the other agents occupying the same position as the agent at a time, determining a movement policy of the robot that selects movement actions with a higher value of the quality measure determined for the robot with higher probability than movement actions with a lower value of the quality measure, and controlling the robot according to the movement policy.

12 Claims, 3 Drawing Sheets

(58) Field of Classification Search
CPC ....... G05B 2219/50391; G05D 1/0221; G05D 2201/0213; G05D 1/0214; G05D 2201/0217; G05D 1/0088; G05D 1/0212; G05D 1/0253; G05D 1/0289; G06N 3/006; G06N 7/005; G06N 20/00; B60W 30/08; B60W 30/095; B60W 30/0956
See application file for complete search history.

(56) References Cited

U.S. PATENT DOCUMENTS

| | | | |
|---|---|---|---|
| 2018/0141544 A1* | 5/2018 | Xiao | G05D 1/0212 |
| 2018/0307239 A1 | 10/2018 | Shalev-Shwartz et al. | |
| 2019/0113929 A1* | 4/2019 | Mukadam | G05D 1/0221 |
| 2019/0278282 A1* | 9/2019 | Palanisamy | G05D 1/0088 |
| 2020/0111366 A1* | 4/2020 | Nanri | B60W 30/10 |
| 2020/0172098 A1* | 6/2020 | Abrahams | B60W 30/09 |
| 2020/0174481 A1* | 6/2020 | Van Heukelom | G06N 20/20 |
| 2020/0198140 A1* | 6/2020 | Dupuis | G01C 21/20 |
| 2021/0237769 A1* | 8/2021 | Ostafew | B60W 30/09 |

OTHER PUBLICATIONS

Mustafa, et al.: "Towards Continuous Control for Mobile Robot Navigation: A Reinforcement Learning and Slam Based Approach", ISPRS—International Archives of the Photogrammetry, Remote Sensing and Spatial Information Sciences, vol. XLII-2/WI3, (2019), pp. 857-863, XP055702085.

Wang, et al.: "Backward Q-learning: The combination of Sarsa algorithm and Q-learning", Engineering Applications of Artificial INtelligence., 26(9), (2013), pp. 2184-2193, XP055700696.

Kuderer, Markus: "Decentralized Control of a Multi-Agent System on the Basis of Non-Cooperative Games", Thesis, Aug. 12, 2010, KIT ISAS, pp. 1-77, XP055701024.

* cited by examiner

METHOD AND DEVICE FOR CONTROLLING A ROBOT

CROSS REFERENCE

The present application claims the benefit under 35 U.S.C. § 119 of European Patent Application No. EP 20157410.0 filed on Feb. 14, 2020, which is expressly incorporated herein by reference in its entirety.

FIELD

The present disclosure relates to devices and methods for controlling a robot.

BACKGROUND INFORMATION

Multi-agent learning is a challenging problem in machine learning that has applications in different domains such as distributed control, robotics (including autonomous driving), and economics. In many multiagent systems, agents do not necessary select their optimum strategies against other agents. For example, autonomous vehicles will not abruptly replace human-controlled vehicles and will not be isolated from human-controlled traffic on separate routes. Therefore, the autonomous vehicles will have to move safely in mixed traffic with other objects controlled by humans, whereby these external objects also include pedestrians as weaker road users. In the case of human-controlled external objects, there is uncertainty as to which movement action these other objects will perform next.

German Patent Application No. DE 10 2018 210 280 A1 describes a method for trajectory planning for an autonomous vehicle in particular in mixed traffic with human controlled other objects. In that method, a Q-function is established for each other object and optimal movement policies are determined for the autonomous vehicle and the other objects by maximizing the Q-functions. From the optimal movement policies, trajectories for the other objects as well as a trajectory for the autonomous vehicle are determined.

However, this method has exponential runtime and memory requirements. The memory requirement of the method is $T \times A \times P \times S^P$, where S is the number of states, P is the number of players, A denotes the number of actions and T is the time horizon (the number of timesteps). Thus, the method may be applied to small state and action spaces with small number of players but the computation time for a multiagent game of 20 states and 4 players and 5 timesteps can easily exceed a computation time of three days.

Accordingly, more efficient approaches for determination of trajectories in a multi-agent scenario are desirable.

SUMMARY

In accordance with example embodiments of the present invention, the method for controlling a robot and the robot controller with the features corresponding to the first example and seventh example described below may provide a more efficient approach for trajectory planning than the approach described above. Since the interactions among the agents are modelled only through a coupling term which includes an occupancy measure, the computational complexity and memory can be reduced. In particular, exponential memory and runtime requirements arising from modelling each agent's behaviour as a Q-function over the product space of the states of all agents can be avoided. For example, for a multiagent game of 20 states and 4 players and 5 timesteps the computation time may be reduced to 1 second and thus make the approach usable in practice.

In the following, exemplary embodiments of the present invention are given.

Example 1 is a method for controlling a robot comprising acquiring sensor data representing an environment of the robot, identifying one or more objects in the environment of the robot from the sensor data, associating the robot and each of the one or more objects with a respective agent of a multiagent system, determining, for each agent of the multiagent system, a quality measure which includes a reward term for a movement action at a position and a coupling term which depends on the probabilities of the other agents occupying the same position as the agent at a time, determining a movement policy of the robot that selects movement actions with a higher value of the quality measure determined for the robot with higher probability than movement actions with a lower value of the quality measure and controlling the robot according to the movement policy.

Example 2 is the method according to Example 1, wherein the coupling term is a functional of occupancy measures of the other agents, wherein, for each agent, the occupancy measure for a position and a time denotes the likelihood of the agent being in the position at the time.

The coupling of the quality measures of the various agents via occupancy measures allows efficiently solving a multiagent reinforcement learning problem and deriving a control policy for the robot.

Example 3 is the method according to Example 1 or 2, wherein determining the quality measures comprises iteratively determining the quality measures in a plurality of iterations, wherein each iteration includes a forward pass from an initial time to an end time over a plurality of time steps and a backward pass from the end time to the initial time over the plurality of time steps.

The iterative approach comprising a forward pass and a backward pass allows resolving the interdependencies of the system of quality measures for the set of agents in an efficient manner.

Example 4 is the method according to Example 3, wherein the coupling term is a functional of occupancy measures of the other agents and the forward pass includes updating, for each agent, the occupancy measure of the next time step by propagating the occupancy measure of the current time step of an agent using the policy of the agent at the current time step.

This allows updating the occupancy measures in an iteration.

Example 5 is the method according to Example 3 or 4, wherein the coupling term is a functional of occupancy measures of the other agents and the backward pass includes updating, for each agent, the quality measure and policy of the agent at the current time step by using the occupancy measure of the other agents at the next time step.

This allows updating the quality measures in an iteration.

Example 6 is the method according to any one of Examples 1 to 5, wherein the movement policy is determined such that the actions for a system state of the multiagent system are distributed according to a Boltzmann distribution depending on the quality measure determined for the robot.

Determining a movement policy as a Boltzmann distribution gives a degree of freedom to deviate from the strictly optimal behaviour.

Example 7 is a robot controller configured to perform a method of any one of Examples 1 to Example 6.

Example 8 is a computer program comprising instructions which, when executed by a computer, makes the computer perform a method according to any one of Examples 1 to 6.

Example 9 is a computer-readable medium comprising instructions which, when executed by a computer, makes the computer perform a method according to any one of Examples 1 to 6.

In the figures, like reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
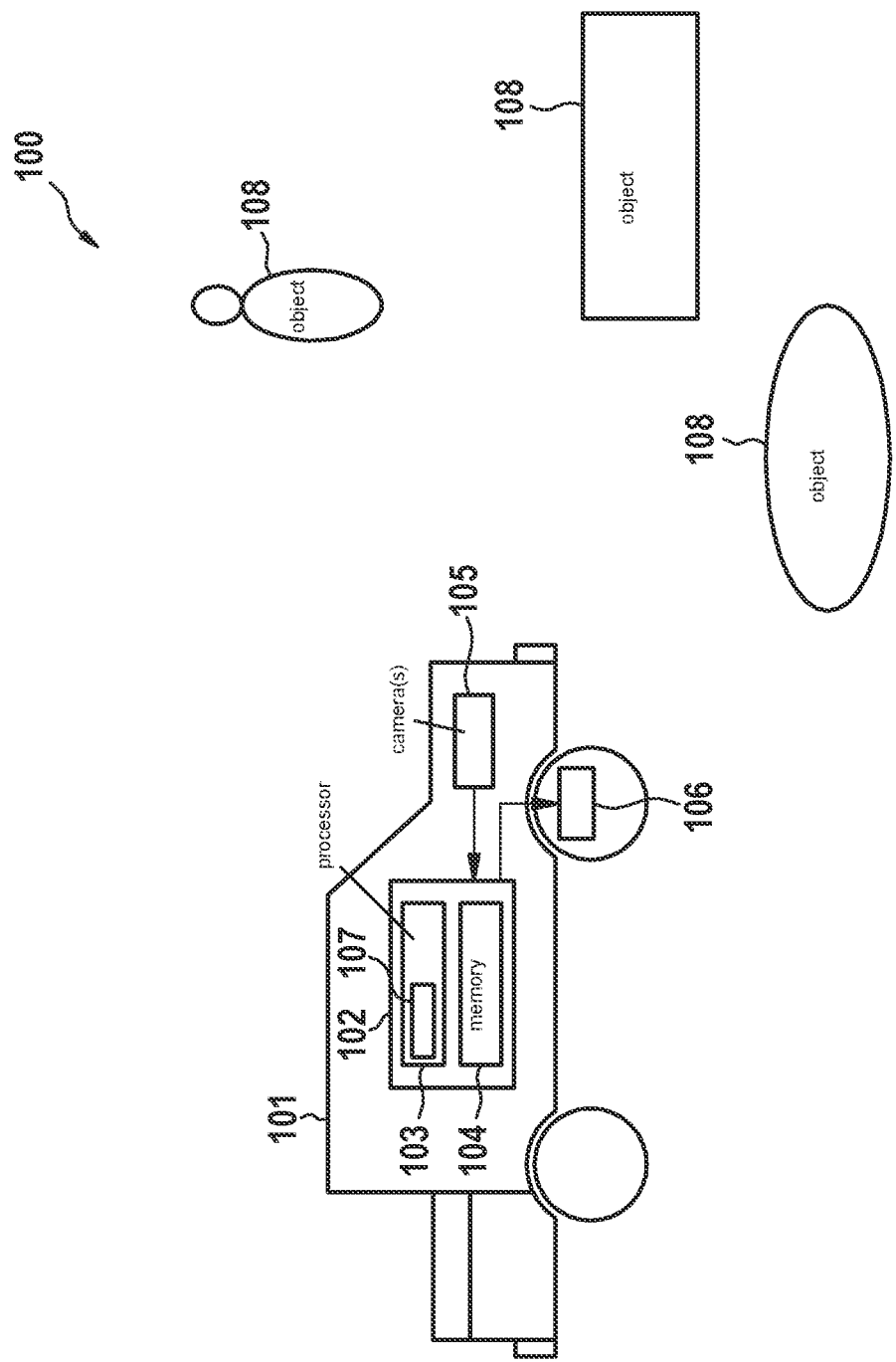
FIG. 1 shows an example for an autonomous driving scenario.

FIG. 1 shows an example for an autonomous driving scenario 100.

In the example of FIG. 1, a vehicle 101, for example a car, van or motorcycle is provided with a vehicle controller 102.

The vehicle controller 102 includes data processing components, e.g., a processor (e.g., a CPU (central processing unit)) 103 and a memory 104 for storing control software according to which the vehicle controller 102 operates and data on which the processor 103 operates.

For example, the stored control software includes instructions that, when executed by the processor 103, make the processor implement movement policy determiner 107.

The movement policy determiner 107 determines a movement policy for the vehicle 101 (and thus a (desired) trajectory for the vehicle 101) in order to avoid a collision with the other objects 108. The other objects 108 can be, in particular, people or vehicles controlled by people, such as conventional motor vehicles or bicycles. However, other objects that cannot be controlled or can only be controlled to a limited extent may also be present, such as a vehicle that rolls away after parking on a slope or a trailer that has broken away from its towing vehicle.

The vehicle controller 102 first identifies the other object 108. For this purpose, a time series of physical observations of the environment can be used, such as a sequence of camera images obtained by one or more cameras 105 and stored in memory 104 or a sequence of events output by an event-based sensor. Alternatively or in combination, information received via a wireless interface of the vehicle 101 can be used. This information can be transmitted by the other objects 108 themselves, for example via a Vehicle-to-Vehicle (V2V) interface. However, the information can also be transmitted by an infrastructure, for example via a Vehicle-to-Infrastructure (V2I) interface.

The movement policy determiner 107 may determine a movement policy (e.g., by determining trajectories of the other objects and a desired trajectory for the vehicle 101) and the vehicle controller 102 controls the vehicle 101 in accordance with the results of the determination. For example, the vehicle controller 102 may control an actuator 106 to control the vehicle's speed, e.g., to actuate the brakes of the vehicle, and direction of the vehicle 101.

According to various embodiments of the present invention, the movement policy determiner 107 models the vehicle 101 and the other objects by a non-cooperative multiagent system that models the interaction between the agents via their occupancy measure. This means that an agent selects its next action based on its benefit (individual reward) and the occupancy measure of the states (e.g., geographical positions). Occupancy measure represents the likelihood of the agents to be at a given state at a given time. It should be noted that the states of all agents at a certain time (time step) are considered to form a (overall) system state of the multiagent system.

According to various embodiments of the present invention, the model uses a set of Q-functions (which can be seen as Q-functions of a multiagent reinforcement learning problem) that are coupled through the occupancy measures (of each state for each agent and timestep). These Q-functions capture the behaviour of the agents at each time step and system state.

The movement policy determiner 107 models the behaviour of traffic participants using the multiagent system. More precisely, the movement policy determiner may use the resulting set of Q-functions to predict the future state of individual traffic participants. This helps controlling the self-driving vehicle without colliding with other traffic participants and create a smooth driving experience.

It should be noted that while embodiments are described for an autonomous driving scenario, the approaches described herein may also be used in other scenarios, e.g., predicting the positions of planes or ships. Similarly, the approaches described herein may not only be used to derive a control policy for an autonomous vehicle but any other robot or autonomous agent.

The term "robot" can be understood to refer to any physical system (with a mechanical part whose movement is controlled), such as a computer-controlled machine, a vehicle, a household appliance, a power tool, a manufacturing machine, a personal assistant or an access control system.

In general, approaches described herein may be used to solve any kind of multi agent game, e.g., in context of one of the application scenarios described above.

Modelling each agent's behaviour at timestep t as a Q-function over the product space of the states of all agents leads to exponential memory and runtime requirements.

According to various embodiments, instead, the Q-functions of each agent at each timestep are made independent of the exact position of the other agents. The individual Q-function of player i at system state x and timestep t only depends on the position of player i and its action and the occupancy measure (probability) of the other agents −i at state x given by $$O_j^\tau(x_i):X\to[0,1]$$

to denote the likelihood of agent j being at state $x_i$ at time $\tau$. More precisely, the Q-function for agent i is defined as $$\tilde{Q}_i^\tau(x_i,a_i):=R_i(x_i,a_i)+\Psi(O_{-i}^\tau(x_i))+\mathbb{E}[\tilde{V}_i^{\tau+1}(x)|x_i,a_i]$$

where $O_{-i}^\tau(x_i):=\{O_1^\tau(x_i),\ldots,O_M^\tau(x_i)\}\backslash\{O_i^\tau(x_i)\}$ where M is the number of agents (or players) and $\Psi(\bullet)$ is a functional. As an example, in the self-driving car scenario, a possible choice for $\Psi(O_{-i}^\tau(x_i))$ is $-\Sigma_{j\in -i}\mu_j O_j^\tau(x_i)$ where $\mu_j>0$.

The expectation is taken over the probabilistic state transitions and the value-function is defined as $\tilde{V}_i^{\tau+1}(x):=\mathbb{E}_{\tilde{\pi}_i^{\tau+1}}[\tilde{Q}_i^{\tau+1}(x;a)]$ and $\tilde{V}_i^T(x)=R_{i,F}(x)$
where $R_{i,F}(x)$ denotes the final reward of agent i at state x.

The movement policy determiner 107 uses the Q-function of player i at system state x at time $\tau$ of action a to compute the policy which defines the probability of selection an action a in a given system state x and time $\tau$.

These Q-functions are coupled using the occupancy probabilities of the agents. Obtaining the Q-functions of the agent imply their strategies (policies). Hence, finding these Q-functions is the goal in the approach for trajectory determination. The Q-functions are the solutions of a set of coupled equations. According to various embodiments, a forward-backward algorithm is used to solve this set of coupled equations. An example for this algorithm is given in the following in pseudo-code.

```
1:   {R_j, R_{j,F}}, T, K
2:   Initialize: (Q̃_j^0), ..., (Q̃_j^T)
3:   for j = 1, ..., M do
4:     O_j^0 ← δ_j, Q̃_j^{T+1} ← R_{j,F}
5:   end for
6:   for k = 1, ..., K do
7:     Forward-pass:
8:     for τ = 1, ..., T and j = 1, ..., M do
9:       O_j^τ ← G_j(O_j^{τ-1}, Q̃_j^{τ-1})
10:    end for
11:    Backward-pass:
12:    for τ = T - 1, ..., 0 and i = 1, ..., M do
13:      Q̃_i^T ← B_i(O_{-i}^τ, Q̃_i^{τ+1})
14:    end for
15:  end for
```

The algorithm starts off by an initial guess of the Q-functions, then in the forward pass, the occupancy measures are updated and in the backward pass, the Q-functions are updated.

More precisely, in the forward pass the occupancy measures of all players at all system states are propagated into the future timesteps $\tau$ using the Q-functions and the occupancy measures from time $\tau-1$.

The action probability may be used to propagate the occupancy measures as follows $$O_i^{\tau+1}(x) = \sum_{x',a}\tilde{\pi}_i^\tau(a|x')P(x|x',a)O_i^\tau(x') = \mathbb{E}_{Exp\{\tilde{Q}_i^\tau\}}[O_i^\tau]$$

$$:= G_i(O_i^\tau, \tilde{Q}_i^\tau), \text{ for } i \in [M],$$

wherein $[M]=\{1,\ldots,M\}$.

The Q-function of player i at system state x at time T of action a may be used to compute the policy which defines the probability of selection an action a in a given state x and time $\tau$:

$$\pi_i(a_i|\vec{x})\propto \exp(\beta Q_i(\vec{x},a_i)), \text{ for } i\in [M]$$

This means that all agents select their mixed strategies such that actions with higher Q-functions are selected with higher probabilities (according to the Boltzmann distribution in this example.)

During the backward pass the Q-function of player i, $Q_i$, is updated using the occupancy measures $O_{-i}$, where $-i$ denotes the opponents of agent i, and the already computed Q-functions from the future time steps, according to $$\tilde{Q}_i^\tau = R_i+\Psi(O_{-i}^\tau)+\mathbb{E}_{Exp\{\tilde{Q}_i^{\tau+1}\}}[\tilde{Q}_i^{\tau+1}]$$

which describes the dependency between the Q-function and the occupancy measures.

The initial conditions of the algorithm are the occupancy measure at time 0 and the Q-functions at the final time step (corresponding to the given final reward).

It should be noted that it is assumed that agents are aware of each other's goals, i.e., reward functions $\{R_j, R_{j,F}\}_j\in [M]$ are known to all the agents.

It can be shown that under certain conditions, the above algorithm converges to a set of unique Q-functions as the number of iterations K tends to infinity.

Figure 2:
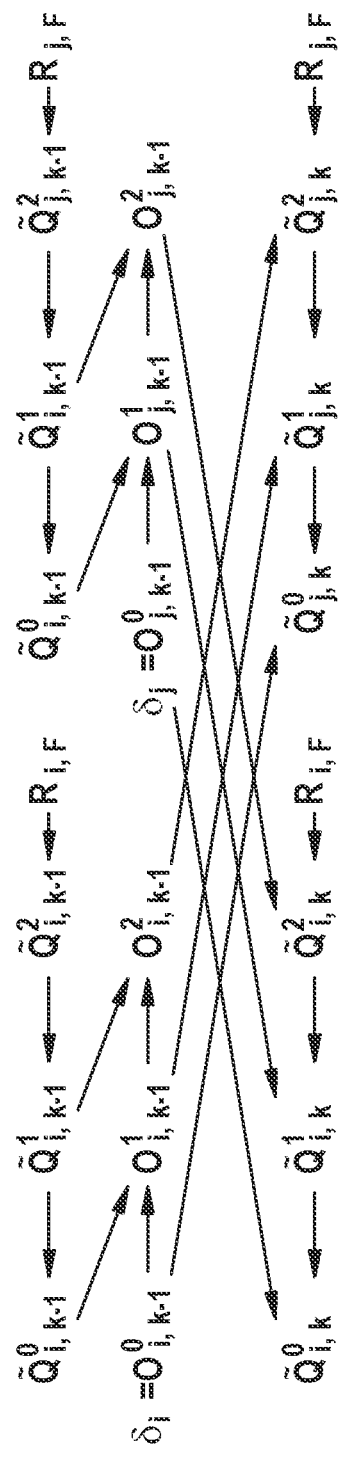
FIG. 2 shows a graphical model demonstrating the dependencies between variables in a multiagent reinforcement learning algorithm according to an example embodiment of the present invention with two agents.

FIG. 2 shows a graphical model 200 demonstrating the dependencies between variables in the above algorithm with two agents {i,j} and time horizon T=2. Here, k denotes the kth iteration of the algorithm $\tilde{Q}_{i,k}^1$ denotes the Q-function of player i at time step 1 at the k-th iteration of the algorithm.

Figure 3:
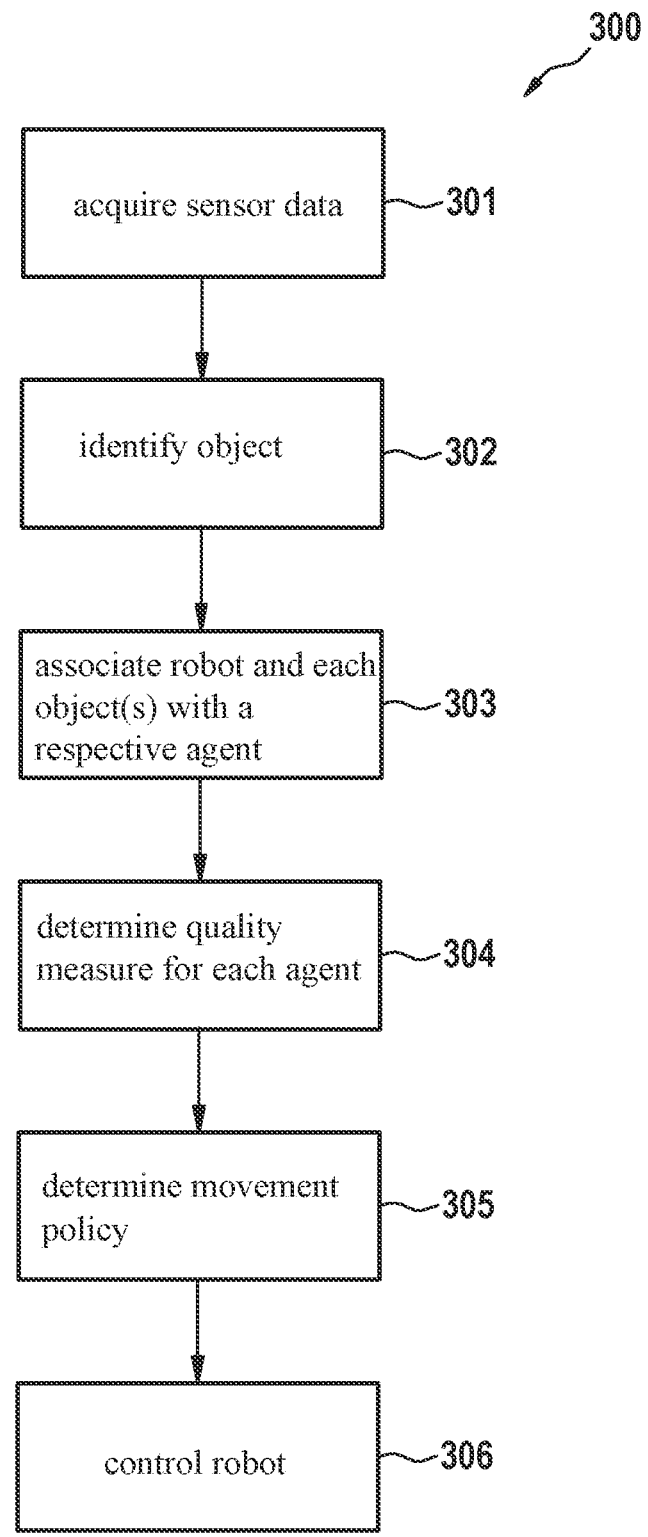
FIG. 3 shows a flow diagram illustrating a method for controlling a robot according to an example embodiment of the present invention.

In summary, according to various embodiments of the present invention, a method is provided as illustrated in FIG. 3.

FIG. 3 shows a flow diagram 300 illustrating a method for controlling a robot according to an embodiment.

In 301, sensor data representing an environment of the robot are acquired.

In 302, one or more objects in the environment of the robot are identified from the sensor data are identified.

In 303, the robot and each of the one or more objects are associated with a respective agent of a multiagent system.

In 304, for each agent of the multiagent system, a quality measure is determined which includes a reward term for a movement action at a position and a coupling term which depends on the probabilities of the other agents occupying the same position as the agent at a time.

In 305, a movement policy of the robot is determined that selects movement actions with a higher value of the quality measure determined for the robot with higher probability than movement actions with a lower value of the quality measure.

In 306, the robot is controlled according to the movement policy.

According to various embodiments of the present invention, in other words, a movement policy of a robot is determined using multiagent reinforcement learning where the Q-function (i.e., quality measure) of agent i is factorized into two terms: the individual goal of the agent that depends only on $(x_i, a_i)$ and another term that encodes the interactions between i and its opponents (by means of occupancy measures).

The method of FIG. 3 may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as data processing unit or logic circuitry. It will be understood that one or more of the method steps described in detail herein may be executed (e.g., implemented) by a data processing unit through one or more specific functions performed by the data processing unit.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of determining a movement policy for controlling a robot, comprising:
   acquiring sensor data representing an environment of the robot;
   identifying one or more objects in the environment of the robot from the sensor data;
   associating the robot and each of the one or more objects with a respective agent of a multiagent system of multiagent reinforcement learning;
   determining, for each agent of the multiagent system, a value of a Q-function, the value of the Q-function being determined as a sum of a reward term for a movement action at a position, an expectation term, and a coupling term, wherein the reward term and the expectation term are independent of the other agents, and wherein the coupling term is a function of occupancy measures of the other agents, wherein, for each agent, the occupancy measure for a position and a time denotes a likelihood of the agent being in the position at the time;
   determining the movement policy of the robot using multiagent reinforcement learning, wherein the movement policy selects movement actions with a higher value of the Q-function determined for the robot with higher probability than movement actions with a lower value of the Q-function.

2. The method according to claim 1, wherein the determining of the values of the Q-functions includes iteratively determining the values of the Q-functions in a plurality of iterations, wherein each iteration includes a forward pass from an initial time to an end time over a plurality of time steps and a backward pass from the end time to the initial time over the plurality of time steps.

3. The method according to claim 2, wherein the coupling term is a function of the occupancy measures of the other agents and the forward pass includes updating, for each agent, the occupancy measure of a next time step by propagating the occupancy measure of a current time step of an agent using the policy of the agent at the current time step.

4. The method according to claim 2, wherein the coupling term is a function of the occupancy measures of the other agents and the backward pass includes updating, for each agent, the value of the Q-function and policy of the agent at a current time step by using the occupancy measure of the other agents at a next time step.

5. The method according to claim 1, wherein the movement policy is determined such that actions for a system state of the multiagent system are distributed according to a Boltzmann distribution depending on the value of the Q-function determined for the robot.

6. The method as recited in claim 1, further comprising: controlling the robot according to the movement policy.

7. The method as recited in claim 1, wherein the step of determining the movement policy of the robot using multiagent reinforcement learning includes predicting a future state of the agents using the values of the Q-functions determined for the agents.

8. A robot controller configured to control a robot, the robot controller configured to:
   determine a movement policy for controlling the robot, wherein, to determine the movement policy, the robot controller is configured to:
      acquire sensor data representing an environment of the robot;
      identify one or more objects in the environment of the robot from the sensor data;
      associate the robot and each of the one or more objects with a respective agent of a multiagent system of multiagent reinforcement learning;
      determine, for each agent of the multiagent system, a value of a Q-function, the value of the Q-function being determined as a sum of a reward term for a movement action at a position, and expectation term, and a coupling term, wherein the reward term and the expectation term are independent of the other agents, and wherein the coupling term is a function of occupancy measures of the other agents, wherein, for each agent, the occupancy measure for a position and a time denotes the likelihood of the agent getting in the position at the time; and
      determine the movement policy of the robot using multiagent reinforcement learning, wherein the movement policy selects movement actions with a higher value of the Q-function determined for the robot with higher probability than movement actions with a lower value of the Q-function; and
   control the robot according to the movement policy.

9. The robot controller as recited in claim 8, wherein the determination of the movement policy of the robot using multiagent reinforcement learning includes predicting a future state of the agents using the values of the Q-functions determined for the agents.

10. A non-transitory computer-readable medium on which are stored instructions for controlling a robot, the instructions, when executed by a computer, causing the computer to perform the following steps:
   acquiring sensor data representing an environment of the robot;
   identifying one or more objects in the environment of the robot from the sensor data;
   associating the robot and each of the one or more objects with a respective agent of a multiagent system of multiagent reinforcement learning;
   determining, for each agent of the multiagent system, a value of a Q-function, the value of the Q-function being determined as a sum of a reward term for a movement action at a position, an expectation term, and a coupling term, wherein the reward term and the expectation term are independent of the other agents, and wherein the coupling term is a function of occupancy measures of the other agents, wherein, for each agent, the occupancy measure for a position and a time denotes a likelihood of the agent being in the position at the time;

determining the movement policy of the robot using multiagent reinforcement learning, wherein the movement policy selects movement actions with a higher value of the Q-function determined for the robot with higher probability than movement actions with a lower value of the Q-function.

11. The non-transitory computer-readable medium as recited in claim 10, wherein the instructions, when executed by the computer, further cause the computer to perform:

controlling the robot according to the movement policy.

12. The non-transitory computer-readable medium as recited in claim 10, wherein the determining of the movement policy of the robot using multiagent reinforcement learning includes predicting a future state of the agents using the values of the Q-functions determined for the agents.

* * * * *